(12) United States Patent
Namgung et al.

(10) Patent No.: US 10,212,391 B2
(45) Date of Patent: Feb. 19, 2019

(54) METHOD AND SYSTEM FOR PROVIDING LARGE-SCALE GROUP COMMUNICATIONS

(71) Applicant: HAEDENBRIDGE CO., LTD., Seoul (KR)

(72) Inventors: Hwan Sik Namgung, Seoul (KR); Ki Hoon Kwon, Gyeongsangbuk-do (KR)

(73) Assignee: HAEDENBRIDGE CO., LTD., Seoul (KR)

( * ) Notice: Subject to any disclaimer, the term of this patent is extended or adjusted under 35 U.S.C. 154(b) by 0 days.

(21) Appl. No.: 15/520,496

(22) PCT Filed: Oct. 16, 2015

(86) PCT No.: PCT/KR2015/010942
§ 371 (c)(1),
(2) Date: Apr. 20, 2017

(87) PCT Pub. No.: WO2016/064139
PCT Pub. Date: Apr. 28, 2016

(65) Prior Publication Data
US 2017/0310930 A1    Oct. 26, 2017

(30) Foreign Application Priority Data

Oct. 21, 2014 (KR) .................. 10-2014-0142345
Feb. 9, 2015 (KR) .................. 10-2015-0019201

(51) Int. Cl.
*H04W 4/00* (2018.01)
*H04N 7/15* (2006.01)
(Continued)

(52) U.S. Cl.
CPC ........... *H04N 7/15* (2013.01); *H04L 12/1813* (2013.01); *H04L 12/1822* (2013.01); *H04L 12/4633* (2013.01); *H04L 29/06* (2013.01); *H04L 29/06027* (2013.01); *H04L 12/185* (2013.01); *H04L 12/1886* (2013.01); *H04L 67/38* (2013.01); *H04N 7/157* (2013.01)

(58) Field of Classification Search
None
See application file for complete search history.

(56) References Cited

U.S. PATENT DOCUMENTS 5,809,512 A * 9/1998 Kato ................. G06F 17/30017
  707/E17.01
9,866,601 B2 * 1/2018 Hinohara ............ H04L 65/4038
(Continued)

FOREIGN PATENT DOCUMENTS

JP     2008-225619 A    9/2008
JP     2010-200273 A    9/2010
(Continued)

*Primary Examiner* — Farah Faroul
(74) *Attorney, Agent, or Firm* — IP Legal Services, LLC

(57) ABSTRACT

The present disclosure relates to a method and system for providing large-scale group communications and, more particularly, to a method and system for providing a real-time service to a plurality of geographically distributed terminals on the same session with little degrading in image quality. A large-scale group communication method according to at least one embodiment may include connecting each of a plurality of geographically distributed terminals to one of a plurality of distributed data transfer systems (DTS) on a same session and transmitting respective media data through the connected DTS.

17 Claims, 6 Drawing Sheets

(51) Int. Cl.
*H04L 12/18* (2006.01)
*H04L 12/46* (2006.01)
*H04L 29/06* (2006.01)

(56) References Cited

U.S. PATENT DOCUMENTS

| | | | | |
|---|---|---|---|---|
| 2006/0002520 | A1* | 1/2006 | Bettis | H04M 3/533 |
| | | | | 379/88.17 |
| 2008/0022012 | A1* | 1/2008 | Wang | H04L 47/10 |
| | | | | 709/238 |
| 2008/0095373 | A1* | 4/2008 | Nagata | H04L 63/10 |
| | | | | 380/278 |
| 2010/0299292 | A1* | 11/2010 | Collazo | G06F 21/577 |
| | | | | 706/14 |
| 2011/0158233 | A1* | 6/2011 | Namgung | H04L 12/1818 |
| | | | | 370/390 |
| 2014/0028788 | A1 | 1/2014 | Halavy | |
| 2015/0120830 | A1* | 4/2015 | Wu | H04L 65/403 |
| | | | | 709/204 |
| 2015/0280959 | A1* | 10/2015 | Vincent | H04L 67/1097 |
| | | | | 709/203 |
| 2016/0286168 | A1 | 9/2016 | Halavy | |

FOREIGN PATENT DOCUMENTS

| | | |
|---|---|---|
| KR | 10-0953507 B1 | 4/2010 |
| KR | 10-2010-0121376 A | 11/2010 |
| KR | 10-1085063 B1 | 11/2011 |
| KR | 10-2014-0016154 A | 2/2014 |
| KR | 10-2014-0098573 A | 8/2014 |

\* cited by examiner

[FIG. 1]
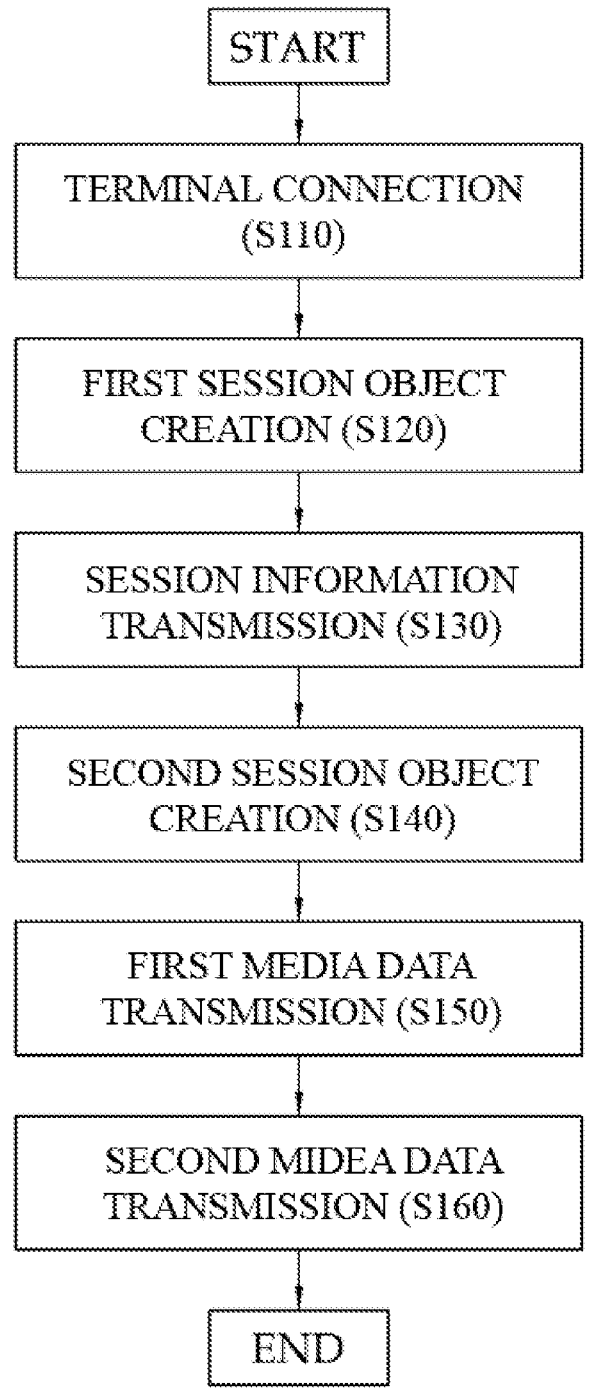

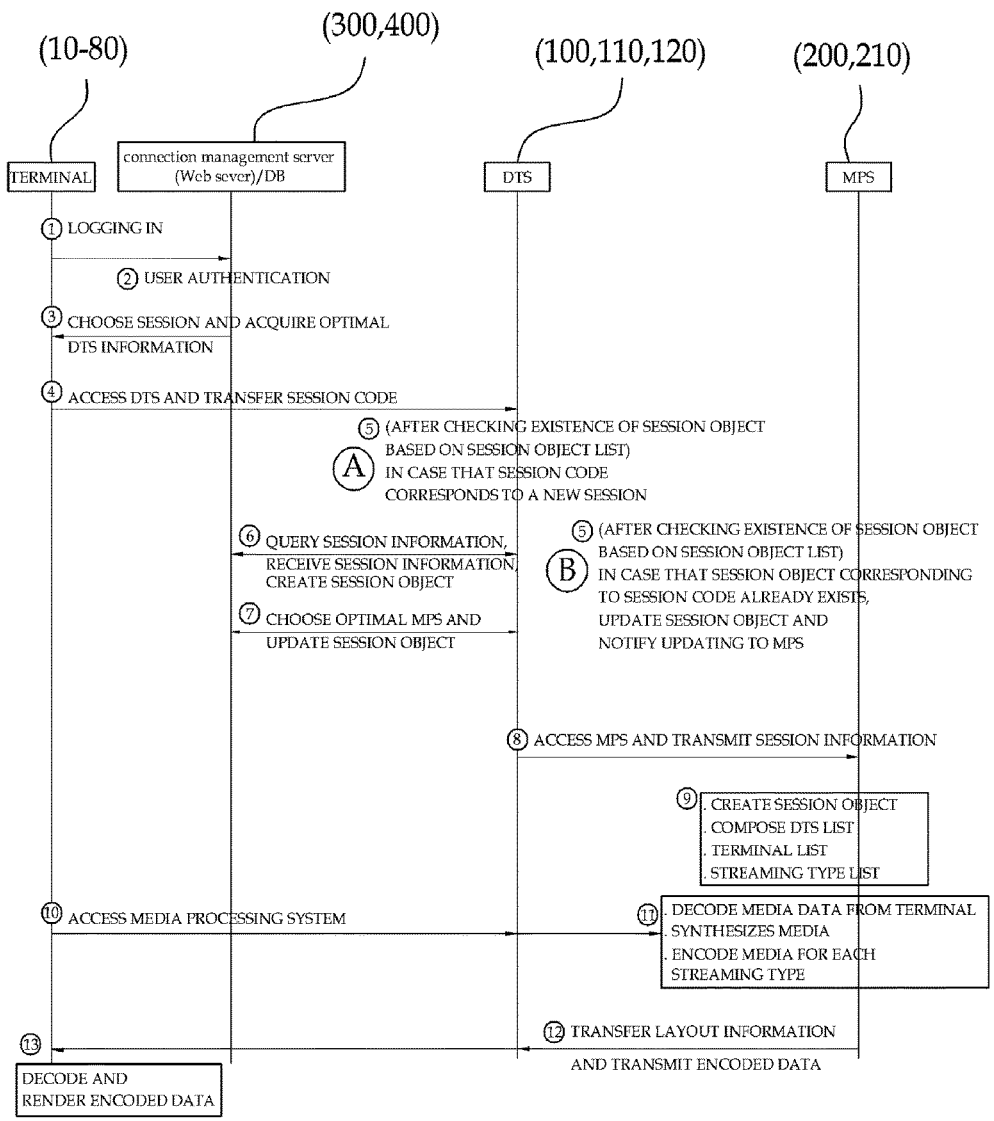
[FIG. 2]

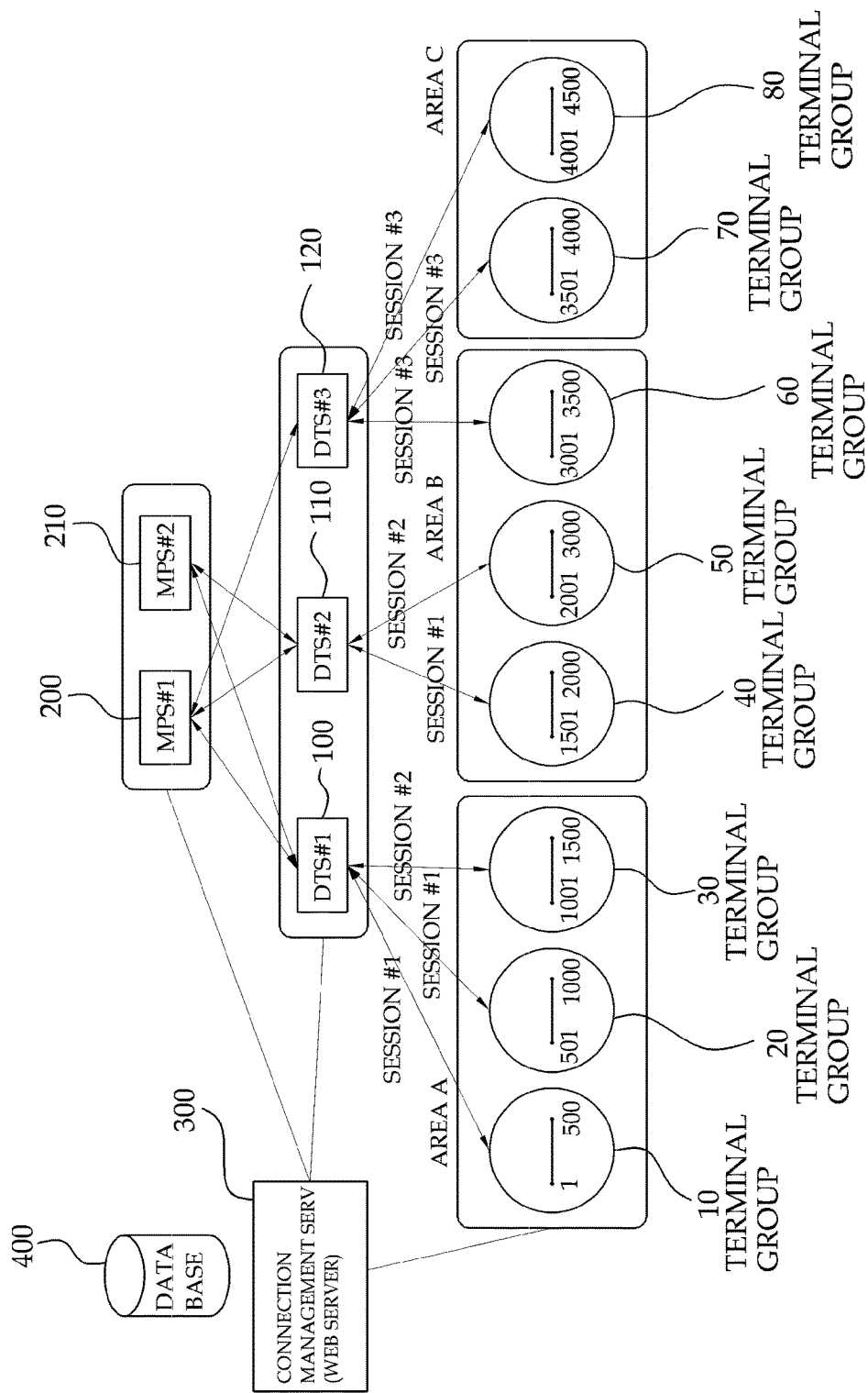
[FIG. 3]

[FIG. 4]

| SESSIONS | TERMINAL GROUPS | DTS GROUPS | MPS GROUPS |
|---|---|---|---|
| SESSION #1 | 10(500UNITS), 20(500UNITS), 40(500UNITS), TOTAL 1,500UNITS | DTS #1, DTS#2 | MPS#1 |
| SESSION #2 | 30(500UNITS), 50(1,000UNITS), TOTAL 1,500UNITS | DTS#1, DTS#2 | MPS#1 |
| SESSION #3 | 60(500UNITS), 70(500UNITS), 80(500UNITS), TOTAL 1,500UNITS | DTS#3 | MPS#1 |

[FIG. 5]
CONFIGURATION OF DTS
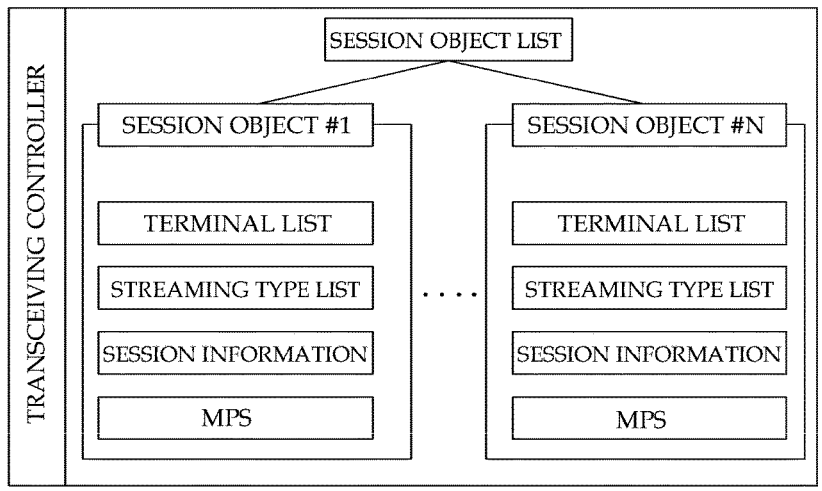
CONFIGURATION OF MPS
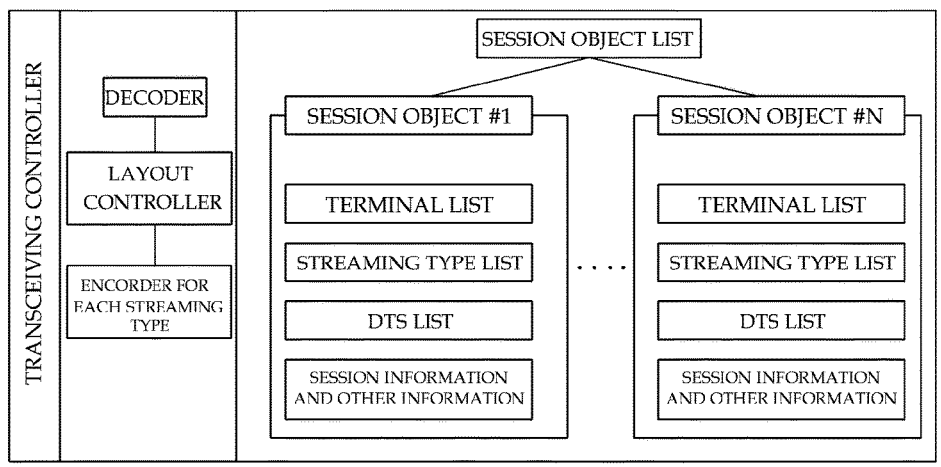

[FIG. 6]
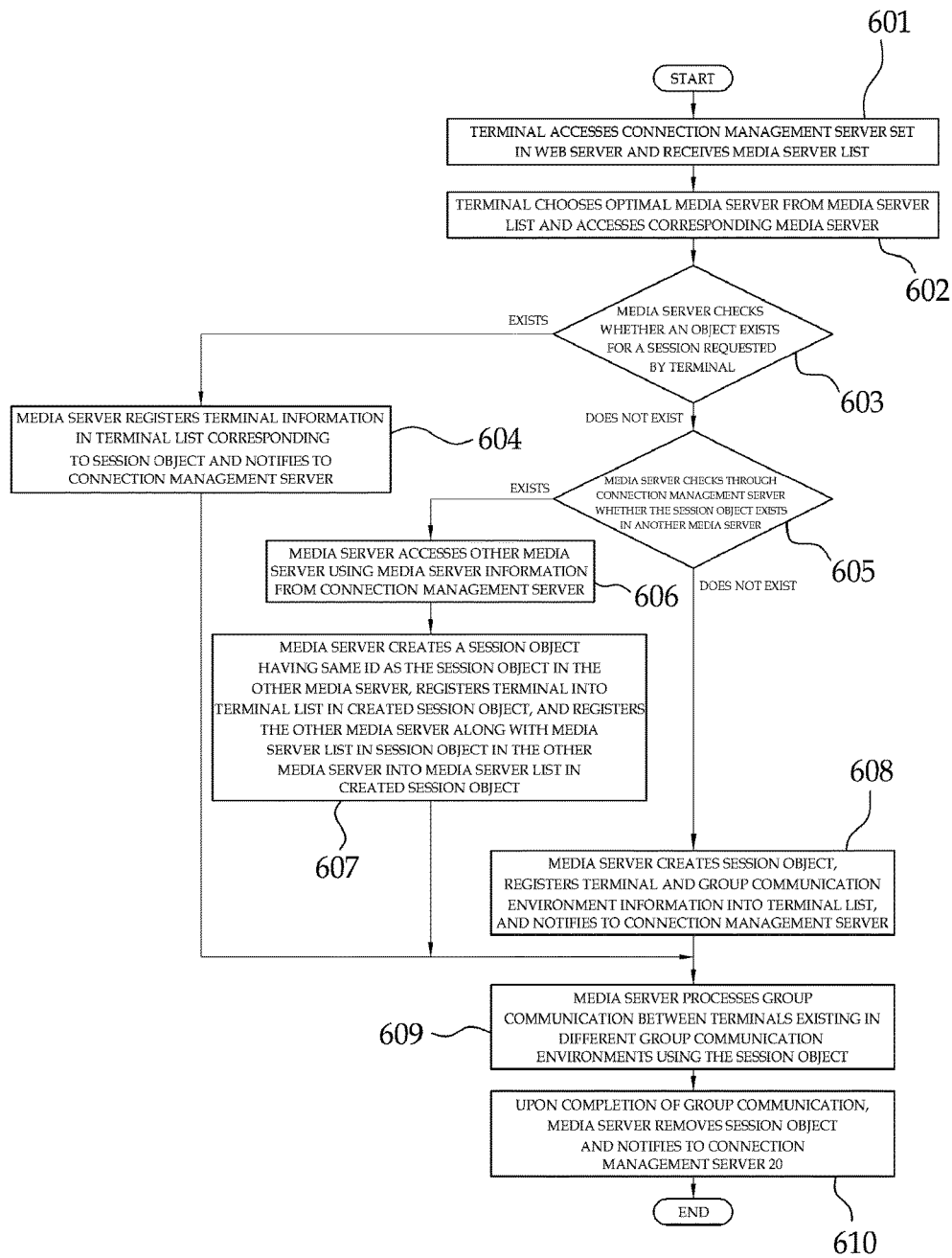

METHOD AND SYSTEM FOR PROVIDING LARGE-SCALE GROUP COMMUNICATIONS

CROSS REFERENCE TO RELATED APPLICATIONS

This application is a National Stage Patent Application of PCT International Patent Application No. PCT/KR2015/010942 (filed on Oct. 16, 2015) under 35 U.S.C. § 371, which claims priority to Korean Patent Application Nos. 10-2014-0142345 (filed on Oct. 21, 2014) and 10-2015-0019201 (filed on Feb. 9, 2015), the teachings of which are incorporated herein in their entireties by reference.

TECHNICAL FIELD

The present disclosure relates to a method and system for providing large-scale group communications and, more particularly, to a method and system for providing a real-time service to a plurality of geographically distributed terminals on the same session with little degrading in image quality.

BACKGROUND ART

In a typical video conferencing on an Internet Protocol (IP) network, an expensive multipoint control unit (MCU) receives media from a plurality of terminals at different locations, combines the media from the terminals, and transmits a combined media to the terminals.

According to the scheme, however, when it is desired to allow as many terminals as possible to access the MCU on a session, the MCU has a resource burden proportional to the number of the terminals to be connected and has to be equipped with communication sockets of which number increases as the number of the terminals. As a result, there exists a problem that the network bandwidth for transmitting the combined media to the connected terminals may be concentrated and uneven.

According to an approach to solve the above problem, MCUs are categorized into master units and slave units to allow lots of geographically distributed terminals to connect to the system on a single session. According to this method, however, the media combined by the slave MCU happen to be re-combined by the master MCU, which results in a lack of flexibility in an image layout processing and an additional expense burden for the MCUs.

According to another method, a relay server relays streaming of the media data for the video conferencing. However, the terminals connected through the relay server cannot participate in bidirectional communications but may receive only unidirectional services of receiving the relayed media data.

In other words, conventional group communication methods for the video conferencing, for example, has been forced to rely on the performance of the MCU and the network bandwidth in order to provide high-quality communications while maintaining a bi-directionality to the users communicating on the same session. Thus, according in the conventional methods, it was difficult to process large-scale video conferencing in which the image layout may be changed flexibly and all the session participants may access the system while maintaining the bi-directional communications state.

A group communication method disclosed in Korean Patent No. 10-1085063 entitled GROUP COMMUNICATION METHOD IN MEDIA SERVER SYSTEM WITH DISTRIBUTED STRUCTURE filed by the present applicant has some similarities with the present disclosure in that both disclosures utilize distributed architectures. FIG. 6 is a flowchart illustrating the group communication method disclosed in the above document.

According to the method of FIG. 6, since the media data and the control signal transferred between the terminals are simply relayed by the data transmission processing system having the distributed architecture, the amount of video or audio data that the terminals connected on a same session receives from another terminals through the data transmission system may increase inevitably as the number of the terminals providing the video or audio increases.

Due to such limitations, the terminals place a heavy burden of decoding the media data on the CPU. Even worse, the bandwidth of the receiving network may limit the number of terminals capable of providing the video or audio on the same session. As a consequence, it is difficult to apply the method to mobile devices such as smartphones commonly being used currently due to the limitation of the CPU.

Accordingly, there is a need for a new terminal connection processing method that is different from the conventional MCU-based method so as to provide services to a plurality of terminals including mobile devices while maintaining bi-directional communications on the same session and ensuring the layout flexibility.

RELATED-ART DOCUMENTS (Patent Document 1) Korean Laid-Open Patent Publication No. 10-2014-98573 entitled APPARATUS AND METHOD FOR PROVIDING VIDEO CONFERENCE (Patent Document 2) Korean Laid-Open Patent Publication No. 10-2014-16154 entitled METHOD AND SYSTEM FOR CONDUCTING VIDEO CONFERENCES OF DIVERSE PARTICIPATING DEVICES (Patent Document 3) Korean Patent Publication No. 10-1085063 entitled GROUP COMMUNICATION METHOD IN MEDIA SERVER SYSTEM WITH DISTRIBUTED STRUCTURE.

DISCLOSURE OF INVENTION

Technical Problem

The present disclosure may provide a method and system for providing a real-time service to a plurality of geographically distributed terminals on the same session with little degrading in image quality.

In other words, the present disclosure may provide a method and system in which each of a large number of geographically distributed terminals connect to one of a plurality of distributed data transfer systems (DTS) on the same session and transmit respective media data, so that the media processing system (MPS) is released from a burden of processing connections of the terminals and traffic concentration over the network and performs the function of synthesizing the media data and the terminals connected to different DTSs maintain the session synchronization of the DTS and maintain the bi-directional communications state.

Also, the present disclosure may provide additional features such as providing group communications with a quality suited for the group communications environment when various terminals existing in different group communications environments perform the large-scale bidirectional group communications.

The objects of the present disclosure are not limited to those set forth above, and other objects and advantages of the present disclosure not mentioned above may be understood by the following description and will be more apparent by the embodiments of the present disclosure. Those having ordinary skills in the art would understood that the objects and advantages of the disclosure may be implemented by the means set forth in the appended claims and combinations thereof.

Technical Solution

According to an aspect of an exemplary embodiment, a large-scale group communication method may include: a terminal connection step of allowing one or more terminals to be connected to a data transfer system (DTS) by using DTS connection information provided by a connection management server; a first session object creation step of creating a first session object including a list of terminals connected to the DTS to which the terminal is connected in the terminal connection step; a session information transmission step of enabling one or more DTSs in which the creation of the first session object has been completed in the first session object creation step to be connected to a media processing system (MPS) allocated by the connection management server and to transmit session information to the MPS and the terminal connected to the DTS; a second session object creation step of enabling the MPS having received the session information in the session information transmission step to create a second session object including a list of connected DTSs and a list of terminals connected to each of the DTSs by using the session information; a first media data transmission step of synthesizing and encoding media data of a terminal received from the DTS of which information is included in the second session object created through the second session object creation step, so as to transmit the synthesized and encoded media data to the DTS; and a second media data transmission step enabling the media data transmitted in the first media data transmission step to be transmitted from the DTS to another terminals.

The lists of terminals included in the first session object and the second session object may include streaming type information indicating an image quality condition for each terminal feature.

In the first media data transmission step, the media data of the terminal received from the DTS may be encoded by the MPS into one or more forms corresponding to the streaming type.

The DTS and the MPS may periodically transmit performance index information including CPU usage information, memory capacity information, and network bandwidth usage information to the connection management server.

The MPS may provide a layout control function of allowing various image layouts so as to be compatible with the streaming type of the terminal in a process of synthesizing the media data in the first media data transmission step.

According to an aspect of another exemplary embodiment, a large-scale group communication system may include: a database; a connection management server interfacing with the database and configured to manage resources of a group communication network and perform session synchronization; a plurality of terminals that may be connected to the group communication network through an authentication of the connection management server; a data transfer system (DTS) configured to be connected to a terminal group including one or more terminals according to an allocation of the connection management server and mediate transmission and reception of media data to and from each terminal in the terminal group; and a media processing system (MPS) configured to receive the media data of the terminal from the DTS, and synthesize and encode the media data to transmit the encoded data to the terminals in the terminal group through the DTS.

The DTS may create and maintain a first session object including a list of terminals included in the terminal group allocated by the connection management server and a streaming type of each of the terminals.

The MPS may create and maintain a second session object corresponding to the first session object and including DTS list information, terminal list information, and the streaming type of each of the terminals.

The MPS may encode the media data of the terminal received from the DTS into one or more forms corresponding to the streaming type.

The MPS may provide a layout control function of allowing various image layouts so as to be compatible with the streaming type of the terminals in a process of synthesizing the media data.

The connection management server may check real-time resource information for each session through an interface with the database to allocate the DTS to the terminal and allocate the MPS to the DTS based on the resource information.

The DTS and the MPS may periodically transmit performance index information including CPU usage information, memory capacity information, and network bandwidth usage information to the connection management server.

Advantageous Effects

According to the present disclosure, a plurality of geographically distributed terminals may receive a bidirectional video conferencing service or an interactive broadcasting service on the same session with a quality suited to respective communications environment through a plurality of DTSs and MPSs.

According to the present disclosure, the distributed DTSs support a clustering architecture to enable processing of large-scale accesses on the same session, and the DTSs support the cascaded architecture along with the MPSs so that a plurality of large-scale sessions may be established. Thus, the present disclosure may efficiently utilize the network bandwidth and provide the terminals with a stable service while maintaining the image quality suitable for the resources and features of the terminals such as the bandwidth. Therefore, the present disclosure may be applied to a variety of fields, which requires handing of large-scale users on the same session, such as interactive online education, entertainment which requires bidirectional event relay, interactive seminar relay, public sectors such as disaster confrontation, and two-way home shopping.

DESCRIPTION OF DRAWINGS

FIG. 1 is a flowchart illustrating a large-scale group communication method according to an embodiment of the present disclosure.

FIG. 2 illustrates communications between a terminal, a connection management server, a DTS, and an MPS in the large-scale group communication method of FIG. 1.

FIG. 3 is a schematic block diagram of a large-scale group communication system according to an embodiment of the present disclosure.

FIG. 4 is a table summarizing connective relationships between terminal groups, the DTS, and the MPS shown in FIG. 3 and sessions set up and maintained by the connections.

FIG. 5 is an exemplary block diagram illustrating structures of and relationships between session objects in the DTS and the MPS applicable to the method and system of FIGS. 1 through 3.

FIG. 6 is a flowchart showing a group communication method in a conventional media server system having a distributed architecture.

BEST MODE

The objects, features, and advantages of the present disclosure will be apparent from the accompanying drawings and the exemplary embodiments set forth below.

It is to be understood that the following specific structure or functional description is illustrative only for the purpose of describing embodiments according to the present disclosure, that the embodiments of the present disclosure may be practiced in various forms, and that the present disclosure should not be construed to be limited to the embodiments set forth in this specification.

Since the embodiments of the present disclosure may undergo various modifications and have various forms, specific exemplary embodiments are illustrated in the drawings and described in detail in this specification. However, the exemplary embodiments are not intended to limit the forms of the embodiments or the present disclosure. It should be under stood that the present disclosure includes all modifications, equivalents, and alternatives falling within the spirit and scope of the disclosure.

The terminologies including ordinals such as "first" and "second" used to explain various elements in this specification may be used to discriminate an element from the other ones or for simplicity. The first element may be renamed to the second element, and the second element may be renamed to the first element.

It will be understood that when an element is referred to as being "connected to" or "coupled to" another element, it can be "directly connected to" or "directly coupled to" the other element, but there may be other component between the two elements. Contrarily, when an element is referred to as being "directly connected to" or "directly coupled to" another element, it should be understood that there is no other component between the elements. Other expressions for describing the relationship between the elements such as "between" and "exactly between" or "adjacent to" and "directly adjacent to" should be interpreted similarly.

The terminology used herein is used to describe particular embodiments only and is not intended to limit the present disclosure. A singular form includes plural referents unless the context clearly dictates otherwise. It is to be understood that the terms "comprising" or "including" as used herein are intended to designate the presence of stated features, integers, steps, operations, elements, parts, or combinations thereof, but do not preclude the presence or addition of another feature, integer, step, operation, element, part, or a combination thereof.

Unless otherwise defined, all terms used herein including technical or scientific terms have the same meaning as commonly understood by those having ordinary skills in the art. Commonly used terms having the same meanings as those defined in dictionaries are to be interpreted as having a meaning consistent with the meaning in the context of the relevant art and should not be interpreted as ideal or overly formal meanings unless explicitly defined herein.

Hereinbelow, the present disclosure will be described in detail in terms of preferred embodiments with reference to the accompanying drawings. The same or similar components may be designated by the same reference numerals throughout the drawings.

FIG. 1 illustrates a large-scale group communication method according to an embodiment of the present disclosure, and FIG. 2 illustrates communications between a terminal, a connection management server, a data transfer system (DTS), and a media processing system (MPS) in the large-scale group communication method of FIG. 1.

Referring to FIG. 1, the large-scale group communication method according to an embodiment of the present disclosure includes a terminal connection step (S110), a first session object creation step (S120), a session information transmission step (S130), a second session object creation step (S140), a first media data transmission step (S150), and a second media data transmission step (S160).

The entire process of the large-scale group communication method according to an embodiment of the present disclosure will be described in detail with reference to FIGS. 1 and 2.

In a first step (step (1) in FIG. 2), an arbitrary terminal groups 10-80 log in a connection management server 300 to receive a group communications service. In a second step (step (2) in FIG. 2), the connection management server 300 allows the service access of the terminal by performing a user authentication for the terminal.

In a third step (step (3) in FIG. 2), after the terminal groups 10-80 which are allowed to access the service choose an arbitrary session, the connection management server 300 selects an optimal DTS connection information corresponding to a respective DTS group among registered DTS groups 100, 110 and 120, and assigns selected DTS connection information to terminals in the terminal groups 10-80.

Afterwards, the terminal group 10-80 accesses an assigned DTS and transfers respective session codes of sessions to be accessed in a fourth step. In a fifth step, the DTS 100, 110, or 120 having received the session code checks whether there exists a session object corresponding to the session code.

If the session object corresponding to the session code already exists in the DTS, the session object is updated to reflect the terminal information and the updating of the session object is notified to the MPS 200 and 210. Subsequently, the MPS also may update its corresponding session object, which may be seen in the drawing.

If, however, the terminal requests a connection to a nonexistent session, the DTS may determine that the session is a new session that is not created yet in the DTS, receive detailed information corresponding to the requested session code from a database 400 through a Web service, and create a session object (e.g., a first session object) including a list of connected terminals, a list of streaming types reflecting features of the terminals, session information, and an access MPS in a sixth step.

In a seventh step, the DTS 100, 110, or 120 chooses an optimal MPS from the database 400 through the Web service of the connection management server 300, and information of a chosen MPS is also stored in the first session object.

In an eighth step, the DTS 100, 110, or 120 establishes a socket connection to the optimal MPS 200 or 210 and to transmit the corresponding session information. In a ninth step, the MPS 200 or 210 creates a session object (e.g., a second session object) including a list of the DTSs, the list of terminals, and the streaming type information. However, in case that a corresponding session object exists in the optimal MPS to which the DTS is connected, the MPS may replace the above process by updating the information of the connected DTS in the DTS list in the corresponding session object.

Structures of and relationships between the first and second session objects in the DTS and the MPS that may be applicable to the method of FIGS. 1 and 2 are illustrated in FIG. 5, for example.

In a tenth step, media in one of the terminals 10-80 that is selected by the terminal or a session arbitrator that is another entity having a control of the session is encoded, and encoded media data is transmitted to the MPS through the DTS.

In an eleventh step, the MPS decodes the received media data from the terminal, synthesizes the media according to layout information set by default or by the session arbitrator, and encodes the media for each streaming type defined in the session information. In a twelfth step, the MPS transmits the layout information and the encoded data to the DTS, and the DTS transmits the encoded media data to the terminals according to the terminal list included in the session object. In a thirteenth step, the terminal decodes and renders the encoded media data received from the DTS, thereby completing the large-scale group communication method according to an embodiment of the present disclosure.

FIG. 3 is a block diagram of a large-scale group communication system according to an embodiment of the present disclosure.

Referring to FIG. 3, the group communication system includes MPS groups MPS 200 and 210, DTS groups 100, 110, and 120, the connection management server or the Web server 300, and the database 400. The database 400 stores basic information of various resources such as a client, a server, and a network, session information that fits purposes of individual sessions, system performance index information received periodically from each system (i.e. DTS and MPS) and including CPU Usage, network bandwidth being used, size of memory being used, number of session objects being processed, and number of connected users. The connection management server 300 or the Web server responds to a service request including a request for a resource registration from an administrator, and requests for session opening, session participation, session deletion, and session change from the terminal groups 10-80 distributed in a small area within a wide area A, B, or C. The DTS groups 100, 110 and 120 are directly accessible by the terminals in the group communications and are responsible for various controls and transmission and reception of the media data. The MPS groups 200 and 210 synthesize and encode media data of the terminals received through the DTS, and transmit the encoded media data to another terminals through the DTS.

Hereinafter, functions and operations of the components mentioned above will be described in more detail.

For convenience of explanation, it is assumed that the terminal groups 10-80 that may access the system are distributed in the areas A, B and C. Also, it is assumed that the terminal groups 10-80 include 4,500 terminals and, among the 4,500 terminals, the terminal groups 10, 20, and 30 in the area A include 1,500 terminals, the terminal groups 40, 50, and 60 in the area B include 2,000 terminals, and the terminal groups 70 and 80 in the area C include 1,000 terminals. Based on such assumptions, a process that a process of providing the group communication service for the terminals on a single session and the characteristics of processes performed by the distributed DTS groups and the MPS groups when a plurality of sessions are established will now be described.

First, the connection management server 300, to which terminals are connected initially, performs a log-in processing that requires a user authentication. Also, the connection management server 300 performs, through Web socket communications, a service application call and setting resource such as a resolution, a frame rate, a bandwidth, a maximum number of users, and maximum number of images for each session. Furthermore, the connection management server 300 interfaces with the database 400 storing user accounts and various system configuration data, and provides various information to each terminal, the DTS, and the MPS that require such information through the Web service. Meanwhile, the connection management server 300 is responsible for transmitting performance index information received from each DTS and MPS to the database 400 through the web service, for example.

Also, when the terminal requests a participation to an arbitrary session, the connection management server 300 chooses an optimal DTS among the distributed DTS groups using the information stored in the database 400 to allocate the optimal DTS to the terminal. Furthermore, the connection management server 300 chooses and allocates an optimal MPS, to the DTS, for processing the media data from a terminal. For these operations, the DTSs and the MPSs may periodically store their performance indices including the CPU usage, the memory capacity, the network bandwidth usage, the number of the service sessions, and the number of the users to the database 400 through the Web service of the connection management server 300.

Here, the method for choosing or recommending the optimal system using the performance index information may be determined in various manners according to the policy of the service provider, and any one of conventional methods may be applied naturally.

The DTSs 100, 110 and 120 may create, update, and delete the session object (i.e., the first session object) for transmitting the media data from the terminals 10-80 and the control data to at least one of the MPSs 200 and 210 in an arbitrary session and transmitting the media data synthesized by the MPS 200 and 210 to the terminals connected in the corresponding session and requested for the service.

When a terminal that requests the session first connects to the DTS and submits the session code information acquired from the Web to the DTS, the DTS may create the first session object by acquiring the detailed session information corresponding to the session code from the database 400 through the Web service of the connection management server 300.

At this time, the information of the connected terminal is registered in the terminal list information of the DTS, and may be registered also in the streaming type list that may be grouped according to quality conditions of transmitted and received images for each terminal feature.

Afterwards, the DTS having chosen the optimal MPS from the database 400 establishes a socket communications connection to the MPS and transmits the session information to the MPS through a process of updating connection MPS properties of the session object. By these operations, the DTS may update the terminal list and the streaming type list in the session object and notify the updating to the MPS when additional terminals are connected to the same DTS to access the corresponding session.

On the other hand, when the DTS accesses the MPS after creating the new session object (i.e., the first session object), the MPS receives the session information from the DTS and generates a second session object corresponding to the first session object. Structures of and relationships between the first and second session objects in the DTS and the MPS that may be applicable to the system of FIG. 3 are illustrated in FIG. 5, for example.

The session object in the MPS may include a list of DTSs being connected in the session, a list of terminals being connected in the session, a list of streaming types of the terminals, and a mix object. Here, the mix object may include the function of decoding media data received from the terminal, the function of synthesizing decoded media data, and the function of encoding the media in different conditions according to the streaming types.

The data encoded by the MPS is transmitted to the DTS groups 100, 110, and 120 of which list is managed by the DTS list.

The MPS may perform a layout control operation for supporting various image layout functions of the terminals during the process of synthesizing the media data. In such a case, the applied layout information may be transmitted to the relevant terminals through the DTS. Such information may be used for displaying a tag in components of the synthesized image or for allowing a terminal having a control authority to change the layout.

Next, described is a process that the terminals 10-80 establish connections in arbitrary sessions (e.g., Session #1 through Session #3) and carry out the group communications.

In the example of FIG. 3, 4,500 terminals distributed in three areas (i.e., area A, B, and C) are configured to use three DTSs 100, 110, and 120 and two MPSs 200 and 210 to receive services in three sessions (i.e., Session #1 through Session #3).

In other words, it is shown in the drawing that, on the first session, the terminal groups 10 and 20 each of which includes 500 terminals in the area A are connected to a first DTS 100, and the terminal group 40 including 500 terminals in the area B is connected to a second DTS 110. The 1,500 terminals are served by a clustering structure of the two DTSs 100 and 110, and the synthesis of the media on the first session is performed in a first MPS 200.

Also, on the second session, the terminal group 30 including 500 terminals in the area A is connected to the first DTS 100, and the terminal group 50 including 1,000 terminals in the area B is connected to the second DTS 110. The 1,500 terminals are served by the clustering structure of the two DTSs 100 and 110, and the synthesis of the media on the second session is performed in a second MPS 210.

Finally, on the third session, the terminal group 60 including 500 terminals in the area B and the terminal groups 70 each of which includes 500 terminals in the area C are connected to the third DTS 120. In particular, the 1,500 terminals are served by the third DTS 120 using a cascading structure according to load balancing feature of the system since the first DTS 100 and the second DTS 110 are already serving the first and second sessions, respectively.

Connective relationships between the terminal groups, the DTS, and the MPS are summarized in FIG. 4 along with the relevant service sessions.

Since it may be meaningless to synthesize the media from all the terminals when hundreds or more terminals are connected on a large scale in a single session, only some of the terminals from which the media are to be transmitted may be selected according to the selection of the session arbitrator or the terminal. In this case, it may be preferable to obtain a permission of the MPS through the DTS in advance before transmitting the media data according to the selection of the terminal itself.

This is because it may be necessary to predefine the maximum number of media to be synthesized in the session so as to check whether the number of media to be synthesized fulfills the criterion. In a state that the number of terminal media is saturated, the terminal having requested the permission for transmitting the media data may be notified by a message, for example, through the DTS that the media cannot be transmitted.

Alternatively, it may be possible to select one of the terminals of which data are being synthesized by applying one or more certain rules, stop transmitting of the media from the terminal, and transmit the media of a newly requested terminal. Here, the present disclosure is not limited to a particular rule for selecting one of the terminals from which the media transmission is stopped or suspended, and those having ordinary skills in the art may apply any one of the conventional rules.

However, selectively allowing only some of the terminals to transmit the media data is a feature of an embodiment of the present disclosure, and the present disclosure is not limited thereto.

While various exemplary embodiments have been described above with reference to the figures, it should be understood that the embodiments should be considered in a descriptive sense only and not for purposes of limitation. Those of ordinary skill in the art would understand that many obvious changes or modifications in form and details may be made therein based on the exemplary embodiments described above without departing from the spirit of the present disclosure.

The invention claimed is:

1. A large-scale group communication method, comprising:
    a terminal connection step of allowing one or more terminals to be connected to a data transfer system (DTS) by using DTS connection information provided by a connection management server;
    a first session object creation step of creating a first session object including a list of terminals connected to the DTS to which the terminal is connected in the terminal connection step;
    a session information transmission step of enabling one or more DTSs in which the creation of the first session object has been completed in the first session object creation step to be connected to a media processing system (MPS) allocated by the connection management server and to transmit session information to the MPS and the terminal connected to the DTS;
    a second session object creation step of enabling the MPS having received the session information in the session information transmission step to create a second session object including a list of connected DTSs and a list of terminals connected to each of the DTSs by using the session information;
    a first media data transmission step of synthesizing and encoding media data of a terminal received from the DTS of Which information is included in the second session object created through the second session object creation step, to transmit the synthesized and encoded media data to the DTS; and
    a second media data transmission step of enabling the media data transmitted in the first media data transmission step to be transmitted from the DTS to another terminal.

2. The method of claim 1, wherein the lists of terminals included in the first session object and the second session object include streaming type information indicating an image quality condition for each terminal feature.

3. The method of claim 2, wherein, in the first media data transmission step, the media data of the terminal received from the DTS is encoded by the MPS into one or more forms corresponding to the streaming type.

4. The method of claim 2, wherein the DTS and the MPS periodically transmit performance index information including Central Processing Unit (CPU) usage information, memory capacity information, and network bandwidth usage information to the connection management server.

5. The method of claim 3, wherein the DTS and the MPS periodically transmit performance index information including Central Processing Unit (CPU) usage information, memory capacity information, and network bandwidth usage information to the connection management server.

6. The method of claim 1, wherein the DTS and the MPS periodically transmit performance index information including Central Processing Unit (CPU) usage information, memory capacity information, and network bandwidth usage information to the connection management server.

7. The method of claim 6, wherein the MPS provides a layout control function of allowing various image layouts to be compatible with the streaming type of the terminal in a process of synthesizing the media data in the first media data transmission step.

8. A large-scale group communication system, comprising:
   a database;
   a connection management server interfacing with the database and configured to manage resources of a group communication network and perform session synchronization;
   a plurality of terminals configured to be connected to the group communication network through an authentication of the connection management server;
   a data transfer system (DTS) configured to be connected to a terminal group including one or more terminals according to an allocation of the connection management server, and perform transmission and reception of media data to and from each terminal in the terminal group; and
   a media processing system (MPS) configured to receive the media data of the terminal from the DTS, and synthesize and encode the media data to transmit the encoded data to the terminals in the terminal group through the DTS.

9. The system of claim 8, wherein the DTS creates and maintains a first session object including a list of terminals included in the terminal group allocated by the connection management server and a streaming type of each of the terminals.

10. The system of claim 9, wherein the MPS creates and maintains a second session object corresponding to the first session object and including DTS list information, terminal list information, and the streaming type of each of the terminals.

11. The system of claim 10, wherein the MPS provides a layout control function of allowing various image layouts to be compatible with the streaming type of the terminals in a process of synthesizing the media data.

12. The system of claim 10, wherein the MPS encodes the media data of the terminal received from the DTS into one or more forms corresponding to the streaming type.

13. The system of claim 12, wherein the MPS provides a layout control function of allowing various image layouts to be compatible with the streaming type of the terminals in a process of synthesizing the media data.

14. The system of claim 9, wherein the MPS provides a layout control function of allowing various image layouts to be compatible with the streaming type of the terminals in a process of synthesizing the media data.

15. The system of claim 8, wherein the MPS provides a layout control function of allowing various image layouts to be compatible with the streaming type of the terminals in a process of synthesizing the media data.

16. The system of claim 15, wherein the connection management server checks real-time resource information for each session through an interface with the database to allocate the DTS to the terminal and allocate the MPS to the DTS based on the resource information.

17. The system of claim 15, wherein the DTS and the MPS periodically transmit performance index information including Central Processing Unit (CPU) usage information, memory capacity information, and network bandwidth usage information to the connection management server.

* * * * *